United States Patent
Stiehler et al.

(10) Patent No.: US 11,242,757 B2
(45) Date of Patent: Feb. 8, 2022

(54) BLADE OR VANE ASSEMBLY FOR A GAS TURBINE AND METHOD OF MANUFACTURE THEREOF

(71) Applicant: MTU Aero Engines AG, Munich (DE)

(72) Inventors: Frank Stiehler, Bad Liebenwerda (DE); Lars Schellhorn, Saalfeld (DE)

(73) Assignee: MTU Aero Engines AG, Munich (DE)

( * ) Notice: Subject to any disclaimer, the term of this patent is extended or adjusted under 35 U.S.C. 154(b) by 79 days.

(21) Appl. No.: 16/503,689

(22) Filed: Jul. 5, 2019

(65) Prior Publication Data

US 2020/0018171 A1    Jan. 16, 2020

(30) Foreign Application Priority Data

Jul. 6, 2018   (DE) .......................... 102018211158.8

(51) Int. Cl.
  *F01D 5/18*  (2006.01)
(52) U.S. Cl.
  CPC ............ *F01D 5/18* (2013.01); *F05D 2220/32* (2013.01); *F05D 2230/30* (2013.01)
(58) Field of Classification Search
  CPC ... F01D 5/18; F01D 5/147; F01D 5/16; F05D 2220/32; F05D 2230/30; F05D 2260/961; F05D 2260/96; F05D 2230/31; Y02T 50/60; Y02P 10/25; B22F 3/1055; B22F 5/04; B33Y 80/00
  See application file for complete search history.

(56) References Cited

U.S. PATENT DOCUMENTS

| 5,667,361 A * | 9/1997 | Yaeger ...................... F01D 5/22 416/193 R |
| 6,375,420 B1 | 4/2002 | Tanuma et al. |
| 9,796,137 B2 | 10/2017 | Zhang et al. |
| 2011/0052412 A1 | 3/2011 | Ader et al. |
| 2013/0001837 A1 | 1/2013 | Goehler et al. |
| 2014/0079540 A1* | 3/2014 | Morris ...................... B22F 5/04 415/178 |
| 2014/0178206 A1 | 6/2014 | Goehler et al. |
| 2016/0214211 A1 | 7/2016 | Gregg et al. |
| 2016/0369634 A1 | 12/2016 | Slavens et al. |

(Continued)

FOREIGN PATENT DOCUMENTS

| DE | 102009048665 A1 | 3/2011 |
| DE | 102011080187 A1 | 2/2013 |
| DE | 102015210014 A1 | 12/2016 |

(Continued)

OTHER PUBLICATIONS

Henrik Alm Grundström (SE): Topology Optimization for Additive Manufacturing Considering Stress and Anisotropy, Examensarbete, LIU-IEI-TEK-A-17/02790—SE, Linkoping Univeristy, Jun. 2017.

*Primary Examiner* — Jacob M Amick
*Assistant Examiner* — Charles J Brauch
(74) *Attorney, Agent, or Firm* — Davidson, Davidson & Kappel, LLC

(57) ABSTRACT

A method for manufacturing a blade or vane assembly having at least one hollow airfoil (10) for a gas turbine, profile sections (A, B, C) of this airfoil being configured (S20) on the basis of a predetermined desired torsion of the airfoil, and the airfoil being manufactured (S30) on the basis of the configured profile sections using an additive manufacturing process (S30).

14 Claims, 1 Drawing Sheet

(56) References Cited

U.S. PATENT DOCUMENTS

2017/0101871 A1 4/2017 Tiedemann
2018/0202296 A1 7/2018 Kiener et al.

FOREIGN PATENT DOCUMENTS

| DE | 102015213090 A1 | 1/2017 | |
|---|---|---|---|
| EP | 2218530 A1 | 8/2010 | |
| EP | 2700459 A1 | 2/2014 | |
| EP | 2772329 A1 | 9/2014 | |
| FR | 3052182 | 12/2017 | |
| WO | WO-2017157620 A1 * | 9/2017 | ............. B33Y 10/00 |

* cited by examiner

BLADE OR VANE ASSEMBLY FOR A GAS TURBINE AND METHOD OF MANUFACTURE THEREOF

This claims the benefit of German Patent Application DE 10 2018 211158.8, filed Jul. 6, 2018 which is hereby incorporated by reference herein.

The present invention relates to a method for manufacturing a blade or vane assembly for a gas turbine, a blade or vane assembly manufactured in accordance with the method, as well as to a gas turbine having the blade or vane assembly.

BACKGROUND

During operation, in particular in response to mechanical and aerodynamic forces, airfoils of stator vanes and of rotor blades of gas turbines are often subject to an elastic torsion out of a reference position about a radial or stacking axis.

Such a torsion has a significant effect on the aerodynamic performance of the blades or vanes since the flow conditions, in particular the inflow, respectively outflow angles hereby change relative to the reference position.

SUMMARY OF THE INVENTION

It is an object of an embodiment of the present invention to enhance a gas turbine, in particular the manufacture and/or operation thereof.

The present invention provides a gas turbine, in particular an aircraft engine gas turbine, that has one or a plurality of compressor stages and/or one or a plurality of turbine stages, (each) having one or a plurality of stator vane arrays and/or one or a plurality of rotor blade arrays, (each) having one or a plurality of hollow airfoils.

Airfoils may thereby be manufactured singly (in each case), or two or more airfoils may be manufactured jointly or integrally with one another (in each case), especially as individual blades or vanes, respectively blade or vane clusters, BLISKs or the like. Accordingly, along the lines of the present invention, an embodiment provides that a blade or vane assembly include, in particular be composed of an airfoil, respectively of the airfoils of one or of a plurality of (hollow) rotor blades or of an airfoil, respectively of the airfoils of one or of a plurality of (hollow) stator vanes of a compressor stage or of a turbine stage of a or of the gas turbine.

Another embodiment provides that a hollow airfoil feature an outer wall having a pressure side and a suction side, which are joined to one another or merge into one another at a leading edge and a trailing edge, as well as an interior space, which is completely or partially enclosed by this outer wall and which, in a further embodiment, is empty, in a further embodiment, may be partially or completely filled with an, in particular macroscopic internal structure, especially braces, lattices or grates or the like, specifically with what is generally referred to as a lattice structure, it may, namely, be composed of the same.

To manufacture such a blade or vane assembly having at least one (first) hollow airfoil for a or for the, respectively of a or of the gas turbine, an embodiment of the present invention provides that profile sections of this airfoil be configured, in particular constructed, designed and/or dimensioned on the basis of a predetermined desired torsion of this airfoil, specifically with the stipulation that this airfoil have the predetermined desired torsion or that a deviation herefrom be minimal, and that the airfoil be manufactured on the basis of these configured profile sections using an additive manufacturing process.

To manufacture a blade or vane assembly having the one or first airfoil and one or a plurality of further hollow airfoils for a or for the, respectively of a or of the gas turbine, an embodiment provides that profile sections of this further airfoil or of these further airfoils also be configured, in particular constructed, designed and/or dimensioned on the basis of a predetermined desired torsion of this further airfoil or of these further airfoils, specifically with the stipulation that this further airfoil or these further airfoils have the desired torsion predetermined (in each case therefor) or that a deviation herefrom be minimal, and that an additive manufacturing process be used to jointly manufacture the one or first airfoil and this further airfoil or these further airfoils on the basis of these configured profile sections.

The underlying idea is to preferably realize a desired torsion by appropriately configuring profile sections of the airfoil(s) in at least one operating point, the additive manufacturing process making it possible to precisely realize the configured profile sections and, in particular a continuous transition between successive, differently configured profile sections.

In an embodiment, a profile section (a cross section) is orthogonal to a radial direction and/or stacking axis of the hollow blade or vane; as is customary in the art, an axial direction being parallel to an axis of rotation or (main) machine axis of the gas turbine, a circumferential direction being a direction of rotation about this axis, and a radial direction being orthogonal to the axial direction and the circumferential direction.

In the present case, a (desired) torsion is especially understood to be a preferably elastic twisting of profile sections of the airfoil about the radial direction or stacking axis in operation relative to an installation position in the case of a gas turbine that is not operating or relative to an, in particular undeformed reference position. In an embodiment, it is derived as the difference between the installation position or reference position and a desired position, in particular a desired blade or vane (inlet angle or outlet angle) or stagger angle of the particular profile section in (at least) one or for (at least) one operating point, in particular the ADP(s) (aerodynamic design point) of the blades or vanes, respectively gas turbine. The desired torsion may, at least in sections, adjust a higher angle of attack for the airfoil, or enhance what is generally referred to as the twist or twisting or also reset it to the axial direction, or reduce the twist or twisting ("untwist"). Thus, in an embodiment, the desired torsion may be specified by a predetermined desired position of the profile sections in the at least one operating point, in particular ADP, and by an installation position in the case of a gas turbine that is not operating, or by a predetermined desired position of the profile sections in the at least one operating point, especially ADP and an, in particular undeformed reference position, thus, specifically by a desired twist in the at least one operating point.

In an embodiment, the desired torsion or the desired twist varies, at least in sections, over the radial height of the airfoil or between successive profile sections; in a further embodiment, continuously, in fact continuously differentiable. In an embodiment, this makes it possible to enhance the aerodynamic performance. Accordingly, in an embodiment, the desired torsion of an airfoil includes the desired torsion of a plurality of the, in particular successive profile sections thereof; thus, especially, in an embodiment, a continuous, in fact continuously differentiable, varying desired twist characteristic over at least one section of the radial extent thereof; in an embodiment, over or along the entire radial height of the airfoil.

In an embodiment, the additive or generative manufacturing process includes locally solidifying and/or bonding loose, in particular liquid and/or powdery raw material layer by layer, especially on the basis of a (computer) model of the blade or vane assembly (to be manufactured). In an embodiment, the entire blade or vane assembly may be additively manufactured. Similarly, in another embodiment, a portion of the blade or vane assembly, in particular at least the airfoil(s) thereof, or a portion of the or of an airfoil or of a plurality of the airfoils may be additively manufactured, and the remainder of the blade or vane assembly, in particular an outer and/or inner shroud, a blade or vane root or the like, in another manner, in particular produced by primary shaping and/or reshaping; an additive manufacturing of the complete blade or vane assembly possibly being beneficial from a standpoint of production engineering and/or strength engineering. In an embodiment, the blade or vane assembly has at least one blade root or vane root to be used for non-destructive, detachable attachment and/or at least one shroud, in particular an inner and/or an outer shroud. The blade or vane assembly may likewise be shroudless.

In an embodiment, the additive manufacturing process is a powder bed process, in particular selective laser melting (SLM), selective laser sintering (SLS), selective heat sintering (SHS), binder jetting (solidifying powder material using binders), electron beam melting (EBM), fused deposition modeling (FDM) or fused filament fabrication (FFF), electron beam welding (EBW) or stereolithography (micro SLA).

In an embodiment, the profile sections of the one or first airfoil and the profile sections of the further airfoil or of one or of a plurality of the further airfoil(s) are differently configured, at least in sections, in order to detune these airfoils relative to each other, thus, in particular such that, respectively with the stipulation that the one or first airfoil and the at least one further airfoil have different natural modes or natural frequencies.

In an embodiment, this makes it advantageously possible to reduce vibrations.

The torsion of profile sections is substantially determined by the torsional stiffness thereof; the dynamic-load induced torsion substantially by the second moments of area thereof about the radial direction or stacking axis.

For that reason, in an embodiment, two or more radially spaced apart profile sections of the one or first airfoil and/or of the further airfoil or of one or of a plurality of the further airfoils are (each) configured and manufactured on the basis of the predetermined desired torsion of the (particular) airfoil with different second moments of area and/or torsional stiffness and/or section moduli about the radial direction or stacking axis. In other words, in an embodiment, the second moment of area and/or the torsional stiffness about the radial direction or the stacking axis in the case of the one or first airfoil between spaced apart, in particular successive profile sections vary/varies, at least in sections, over the radial height of this airfoil; in an embodiment, continuously, in fact continuously differentiably, respectively, the one or first airfoil has, at least in sections, a, in particular continuously, in fact continuously differentiably, varying characteristic of the second moment of area thereof and/or of the torsional stiffness thereof. Additionally or alternatively, in an embodiment, the second moment of area and/or the torsional stiffness and/or the section modulus vary/varies about the radial direction or stacking axis in the case of the at least one further airfoil between spaced apart, in particular successive profile sections, especially at least in sections, over the radial height of this airfoil, in an embodiment, continuously, in fact continuously differentiably; respectively, the at least one further airfoil has, at least in sections, an especially continuous, in fact continuously differentiable, varying characteristic of the second moment of area thereof and/or of the torsional stiffness thereof.

The desired torsion may be hereby realized especially advantageously, in particular simply and/or reliably.

The torsional stiffness and also the second moment of area, as well as the section modulus of a profile section about the radial direction or stacking axis is substantially determined by the outer wall thickness and internal structure thereof.

For that reason, in an embodiment, two or more radially spaced apart profile sections of the one or first airfoil and/or of the further airfoil or of one or of a plurality of the further airfoils are (each) configured and manufactured on the basis of the predetermined desired torsion of the (particular) airfoil with different, in particular maximum, minimum and/or medium outer wall thicknesses, namely outer wall thickness distributions or characteristics along the profile or the chord line thereof, and/or, in particular with macroscopic internal structures, specifically bracings of varying number, wall thickness, and/or shape. In other words, in an embodiment, the, in particular macroscopic internal structure varies in number, wall thickness and/or shape of the bracings thereof, and/or the, in particular maximum, minimum and/or medium outer wall thickness, namely outer wall thickness distribution, in the case of the one or first airfoil between spaced apart, in particular successive profile sections, specifically at least in sections, over the radial height of this airfoil; in an embodiment, continuously, in fact continuously differentiably. Additionally or alternatively, in an embodiment, the, in particular macroscopic internal structure varies in number, wall thickness and/or shape of the bracings thereof, and/or the, in particular maximum, minimum and/or medium outer wall thickness, namely outer wall thickness distribution, in the case of the at least one further airfoil between spaced apart, in particular successive profile sections, in particular at least in sections, over the radial height of this airfoil; in an embodiment, continuously, in fact continuously differentiably.

The desired torsion may be hereby realized especially advantageously, in particular simply and/or reliably.

In an embodiment, one or a plurality of, in particular all steps of the method are performed in a fully or partially automated fashion.

BRIEF DESCRIPTION OF THE DRAWINGS

Other advantageous embodiments of the present invention will become apparent from the dependent claims and the following description of preferred embodiments. To this end, the drawing shows, partly in schematic form, in:

DETAILED DESCRIPTION

Figure 1:
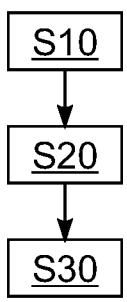
FIG. 1: a method for manufacturing a blade or vane assembly in accordance with an embodiment of the present invention.
Figure 2:
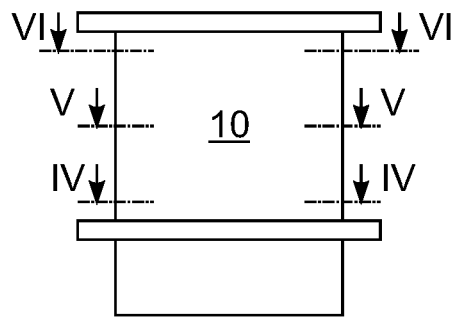
FIG. 2: a hollow airfoil of the blade or vane assembly in a plan view in the circumferential direction.
Figure 3:
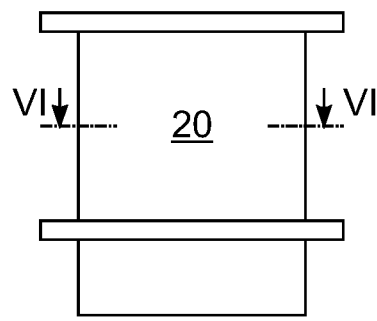
FIG. 3 another hollow airfoil of the blade or vane assembly in a plan view in the circumferential direction.

FIG. 1 shows a method for manufacturing a blade or vane assembly in accordance with an embodiment of the present invention that is composed of a (first) hollow blade 10 (compare FIG. 2) or also additionally of at least one further hollow blade 20 (compare FIG. 3).

A desired torsion is predetermined (in each case) in a first step S10 for the airfoil or for one or a plurality of the airfoils.

In a second step S20, profile sections of the airfoil(s) are configured in such a way, respectively with the stipulation that it/they feature this desired torsion in the ADP.

In a third step S30, the airfoil(s) is/are (jointly) manufactured on the basis of, respectively with the configured profile section(s) using an additive manufacturing process, in an embodiment, together with a blade root or vane root, and an inner and, if indicated, outer shroud.

Figure 6:
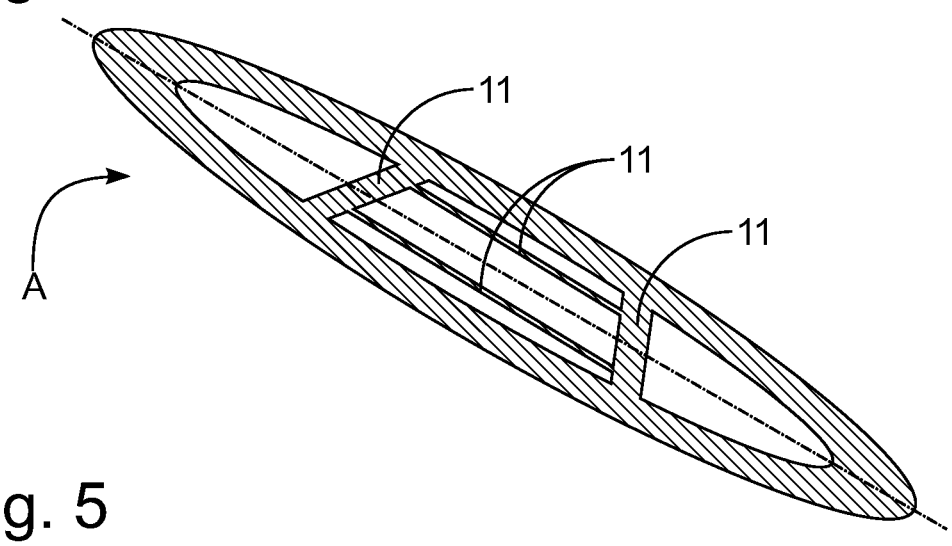
FIGS. 4, 5 and 6: profile sections of the airfoils.
Figure 5:
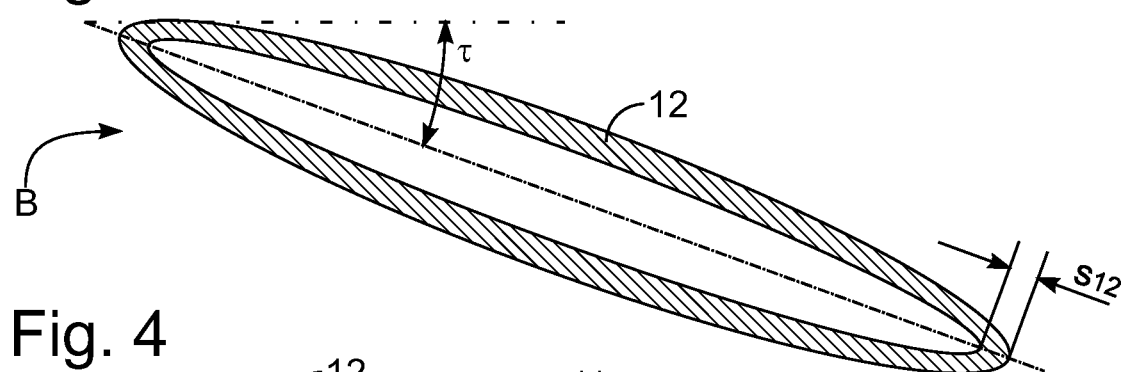
Figure 4:
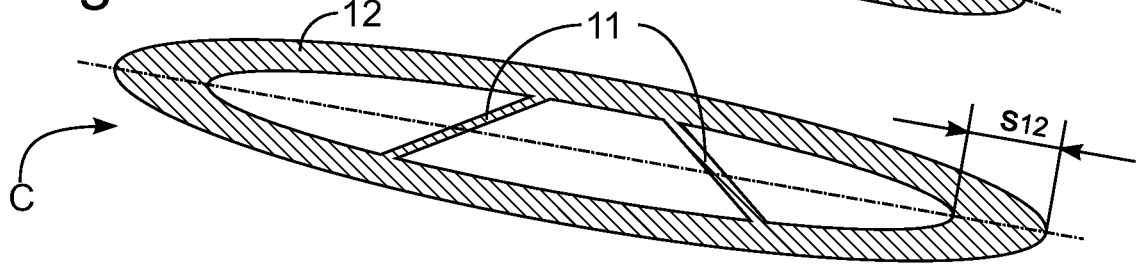

FIG. 2 shows airfoil 10 in a plan view in the circumferential direction; FIG. 4-6 three profile sections A, B, respectively, C of the airfoil along lines IV-IV, V-V, respectively VI-VI in FIG. 2.

These three profile sections differ exemplarily in the wall thicknesses of outer walls 12 thereof, as well as in the number, wall thickness and shape of the bracings thereof. Exemplarily indicated to this end in FIG. 5, 6 are outer wall thicknesses $S_{12}$ and, in FIGS. 4-6, various bracings 11.

Profile sections of both airfoils 10, 20 are differently configured, at least in sections, in order to detune the two airfoils relative to each other.

Exemplarily shown for this purpose in FIG. 6 is the profile section of first airfoil 10 along lines VI-VI in FIG. 2, and also the profile section of further airfoil 20 along lines VI-VI in FIG. 3, which are identical in the exemplary embodiment merely for the sake of a more compact illustration.

In addition, in FIG. 5, an airfoil angle τ is drawn relative to the axial direction indicated by a dot-dash line, which ensues in the ADP, since airfoil 10 features the predetermined desired torsion therein as the result of the configured profile sections thereof.

Although exemplary embodiments were explained in the preceding description, it should be noted that many modifications are possible.

Thus, in particular as already mentioned, the blade or vane assembly may also feature only one single airfoil, specifically airfoil 10.

It should also be appreciated that the exemplary embodiments are merely examples and are in no way intended to restrict the scope of protection, the uses or the design. Rather, the foregoing description provides one skilled in the art with a guideline for realizing at least one exemplary embodiment; various modifications being possible, particularly with regard to the function and placement of the described components, without departing from the scope of protection as is derived from the claims and the combinations of features equivalent thereto.

LIST OF REFERENCE NUMERALS

10 first hollow airfoil
11 bracing (internal structure)
12 outer wall
20 second hollow airfoil
A, B, C profile section
$s_{12}$ outer wall thickness
τ airfoil angle

What is claimed is:

1. A method for manufacturing a blade or vane assembly having a hollow airfoil for a gas turbine, the method comprising:
    configuring profile sections of the airfoil on the basis of a predetermined desired torsion of the airfoil, wherein the predetermined desired torsion is an elastic twisting of the profile sections of the airfoil about a radial direction during turbine operation relative to an undeformed reference position; and
    manufacturing the airfoil on the basis of the configured profile sections using an additive manufacturing process.

2. The method as recited in claim 1 wherein the blade or vane assembly has a further hollow airfoil, further profile sections of the further airfoil being configured on the basis of a further predetermined desired torsion of the further airfoil, and the additive manufacturing process being used to jointly manufacture the airfoil and the further airfoil on the basis of the configured profile sections and the further profile sections.

3. The method as recited in claim 1 wherein the profile sections of the airfoil and the further profile sections of the further airfoil are differently configured, at least in sections, in order to detune the airfoil and the further airfoil relative to each other.

4. The method as recited in claim 2 wherein at least two radially spaced apart profile sections of the airfoil or at least two radially spaced apart further profile sections of the further airfoil are configured and manufactured on the basis of the predetermined desired torsion or the further predetermined torsion with different second moments of area or torsional stiffness or section moduli.

5. The method as recited in claim 1 wherein at least two radially spaced apart profile sections of the airfoil are configured and manufactured on the basis of the predetermined desired torsion with different second moments of area or torsional stiffness or section moduli.

6. The method as recited in claim 2 wherein at least two radially spaced apart profile sections of the airfoil or at least two radially spaced apart further profile sections of the further airfoil are configured and manufactured on the basis of the predetermined desired torsion or the further predetermined torsion with different outer wall thicknesses or internal structures of varying number, wall thickness, or shape.

7. The method as recited in claim 6 wherein the internal structures are macroscopic bracings.

8. The method as recited in claim 1 wherein at least two radially spaced apart profile sections of the airfoil are configured and manufactured on the basis of the predetermined desired torsion with different outer wall thicknesses or internal structures of varying number, wall thickness, or shape.

9. The method as recited in claim 8 wherein the internal structures are macroscopic bracings.

10. The method as recited in claim 1 wherein a variation from a first profile section of the profile sections to a second profile section of the profile sections differing from the first profile section is continuous.

11. The method as recited in claim 10 wherein the first and second profile sections are adjacent.

12. A blade or vane assembly for a gas turbine manufactured in accordance with the method as recited in claim 1.

13. A gas turbine comprising at least one compressor stage or turbine stage having at least one stator vane array or rotor blade array having at least one blade or vane assembly as recited in claim 12.

14. An aircraft engine gas turbine comprising the gas turbine as recited in claim 13.

\* \* \* \* \*